| United States Patent [19]
Marin

[11] 3,936,574
[45] Feb. 3, 1976

[54] OXIDATION RESISTANT CARBONACEOUS BODIES AND METHOD OF PRODUCING SAME

[75] Inventor: Glenn R. Marin, Niagara Falls, N.Y.

[73] Assignee: The Carborundum Company, Niagara Falls, N.Y.

[22] Filed: Jan. 29, 1973

[21] Appl. No.: 327,264

[52] U.S. Cl................................. 428/408; 427/377
[51] Int. Cl......................... B44d 1/02; C23c 17/06
[58] Field of Search ...... 117/160R, 151 UE, 46 CB, 117/46 CC, 119, DIG. 10, DIG. 11; 260/37 M; 106/290

[56] References Cited
UNITED STATES PATENTS
2,992,960   7/1961   Leeg ..................................... 154/128

Primary Examiner—P. E. Willis, Jr.
Attorney, Agent, or Firm—David E. Dougherty; Raymond W. Green; Clayton O. Obenland

[57] ABSTRACT

An oxidation inhibitant paint for coating the surfaces of carbon or graphite articles comprises a suspension of about 10 to about 35 percent finely divided elemental boron, dispersed in a thermosetting resin such as a solution of furfuryl alcohol prepolymer, furfural and maleic anhydride. Silica or boron nitride may be added to the paint mixture, a preferred paint composition having about 22 to 23 percent boron and 2 to 3 percent silica, dispersed in a resin solution of about 48 to 49 percent furfuryl alcohol prepolymer, about 48 to 49 percent furfural and about 2 to 4 percent maleic anhydride. The paint may be applied to the carbon article (e.g., by brushing, spraying, dipping or rolling) and then cured to give a firmly adherent coating of resin, silica and elemental boron. The coating is strongly resistant against thermal and mechanical stresses applied to the carbon article, protecting the carbon against oxidation at temperatures up to at least 900°C.

2 Claims, No Drawings

OXIDATION RESISTANT CARBONACEOUS BODIES AND METHOD OF PRODUCING SAME

BACKGROUND OF THE INVENTION

Carbon and graphite articles have found many applications in modern industry, particularly in the aerospace and aviation fields, where resistance to corrosion, high temperature, thermal shock and excellent wear characteristics are required of the material to be used. In this connection, reinforced articles consisting essentially of carbon or graphite fibers bound by a carbon or graphite matrix into integral bodies have been very useful. Exposure to high temperatures in the presence of oxygen shortens the useful life of such bodies due to oxidative erosion. Since carbon and graphite are otherwise resistant to elevated temperatures, protection against oxidation is highly desirable. A certain degree of oxidation resistance may be achieved by incorporating various additives within the matrix of the carbon or graphite bodies during manufacture. This procedure is difficult and time consuming however, and does not provide maximum protection to the exterior surface of the article, the area where oxidation usually begins. A quicker and easier treatment is desirable in which the carbon or graphite article can be treated after fabrication and then maintained in an oxidation resistant state afterwards by periodic treatments, if required. Several types of treatments have been developed for the protecive coating of carbon or graphite articles. These leave much to be desired, however, with respect to such factors as coating durability and protective ability at relatively high temperatures of up to at least 900°C.

SUMMARY OF THE INVENTION

The invention provides a paint for protecting carbonaceous articles against oxidation, the paint comprising a suspension of finely divided elemental boron in an uncured thermosetting resin solution. The boron may comprise from about 10 to about 35 percent of the paint suspension, preferably about 20 to 25 percent with the balance being the uncured resin solution. This resin solution may preferably comprise about 40 to 60 percent furfuryl alcohol prepolymer, about 40 to 60 percent furfural and about 1 to 10 percent maleic anhydride. Finely divided boron nitride or silica may also be added to the paint composition; the boron, boron nitride and silica preferably having average particle diameters ranging from about 0.5 to 2 microns. The paint is applied to the surface of the carbonaceous substrate and the thermosetting resin is cured, preferably at 300°–400°F under an inert atmosphere, to give an oxidation resistant coating. Oxidation resistant carbon articles are provided by this method in which the coating provides oxidation protection up to temperatures of at least about 900° C.

DESCRIPTION OF THE PREFERRED EMBODIMENTS

According to the present invention, carbonaceous articles are made oxidation resistant by coating a carbonaceous substrate with a paint of finely divided boron suspended in an uncured thermosetting resin solution. In this description, the word "carbon" refers to carbon in all its forms, including graphite, and "carbonaceous articles" or "carbon articles" refer to various articles consisting primarily of carbon. All percentages used in the following specification and claims are by weight, unless otherwise specified.

The coating paint comprises from about 10 to about 35 percent finely divided elemental boron dispersed in from about 65 to about 90 percent of a thermosetting resin solution, such as one containing furfuryl alcohol prepolymer, furfural and maleic anhydride. In addition to the boron, other refractory materials such as boron nitride and silica may also be included in the paint. A preferred paint composition comprises from about 20 to about 25 percent boron with from about 75 to about 80 percent of the thermosetting resin solution. The solution preferably comprises about 40 to about 60 percent furfuryl alcohol prepolymer, about 40 to about 60 percent furfural and about 1 to about 10 percent maleic anhydride. The furfuryl alcohol prepolymer is a commercially available product, being sold, for example, by Varcum Chemical Division of Reichhold Chemicals, Inc., Niagara Falls, N.Y. The surface of the carbon article to be coated is preferably first cleaned by abrasion or otherwise, then washed with a solvent such as methanol or tricholroethylene and oven dried. It is important for best results that the article be thoroughly cleaned and that no impurities such as grease or oil remain upon the surface. After cleaning, the paint is then applied by conventional techniques such as brushing or spraying, care being taken to apply the coating in a thin uniform layer without leaving droplets or beads on the corners of the article. The coating is then cured by a thermal treatment appropriate to the thermosetting resin employed. For the preferred furfuryl alcohol prepolymer, furfural and maleic anhydride thermosetting resin solution, curing is preferably accomplished by heating at 300°–400°F in an autoclave for about 2 hours, the autoclave being kept under an inert gas pressure of about 120 psi. In an alternate method, the curing may be done in an oven at 300°–400°F under atmospheric conditions. Air curing at room temperature is not recommended, but may be acceptable if the above heat treatment is not convenient.

When properly applied and cured, the oxidation resistant coating is effective at temperatures as high as at least 900°C and oxidation is greatly reduced, as compared with similar uncoated articles at these temperatures. As previously pointed out, oxidation resistance is highly important in carbon articles, especially for reinforced and laminated articles which are subjected to both high temperatures and mechanical stresses during service. While the paint of the invention was developed primarily for the protection of these types of carbon articles, it is not limited to these, but may also be used to protect the exterior surfaces of dense carbon articles such as insulating blocks and casting molds, which also attain high temperatures in service.

Carbon articles show little change in appearance after being coated with the paint of the invention. The paint cures to leave a light brown coating of inorganic component and polymerized resin on the surface of the article. The cured coating may have at least one finely divided refractory material as an inorganic component, the material being boron nitride, silica, elemental boron or a mixture of these. The coating is thin (preferably about 0.001 in. thickness) and adheres strongly to the carbon surface, retaining this adherance even when subjected to mechanical shock and thermal cycling. As mentioned previously, the coating protects the carbon against oxidation at temperatures up to at least 900°C. At this point, the resin component has carbonized but the boron, boron nitride, silica or a mixture of these, remain as protective components. Boron is the essential component and while the function of this in oxidation resistance is not definitely known, it seems probable that instead of the carbon being oxidized a thin glassy protective coating of boron oxide is formed at and partly within the carbon surface, thus acting to protect the underlying carbon against oxidation.

While the use of elemental boron is essential in the paint of the invention, the paint may contain, as previously mentioned, additional materials such as boron nitride or silica. Boron nitride may be added in amounts ranging from about 1 to about 15 percent of the paint mixture while silica may be added in amounts ranging from about 1 to about 5 percent of the mixture. A preferred paint composition, including silica, may comprise from about 22 to about 23 percent boron, from about 2 to about 3 percent silica and about 75 percent of a thermosetting resin solution, the solution having (by weight of the solution) about 48 to 49 percent furfuryl alcohol prepolymer, about 48 to 49 percent furfural and about 2 to 4 percent maleic anhydride. The boron, boron nitride, and silica are finely divided particles, preferably having average particle diameters in the range of about 0.5 to 2 microns, although larger or smaller particles, at least as large as 10 microns or as small as 0.2 microns, may be used. Commercial grades of boron, boron nitride and silica have given satisfactory results in the compositions of the invention. An example of a commercial grade of boron which can be used in the present invention is that supplied by the American Potash & Chemical Corporation which comprises about 90 to 92 percent pure boron, about 4 to 6 percent magnesium and less than about one percent each of various residual materials. Since the thermosetting resin functions primarily as a coating vehicle for the finely divided boron, the use of resins other than those described is included in the concepts of the invention. Such alternate resins may include for example, resins such as phenolic resins, polyester resins (including alkyd resins), amino resins, epoxy resins, polyurethane resins, silicone resins, pitch and mixtures thereof.

One method of coating and testing a carbon body is described in the following example.

EXAMPLE

Three paint mixtures were prepared for testing. The first paint was made by thoroughly mixing 25 gms. of finely divided commercial grade (90-92% pure) elemental boron with 75 gms of polymerizable resin solution. The second paint was made in a similar fashion from a mixture of 12.5 gms. of elemental boron and 12.5 gms. of boron nitride in 75 gms. of resin solution, while the third paint was made from a mixture of 22.5 gms. of boron and 2.5 gms. silica, also in 75 gms. of resin solution. The boron, boron nitride and silica were finely divided, with particles having average diameters in the range of about 0.5 to 2 microns. The resin solution had the composition of about 48 percent furfuryl alcohol prepolymer, about 48 percent furfural, and about 4 percent maleic anhydride.

Light coatings of the three paints were brushed on the surface of a small piece of reinforced laminated carbon substrate, the surface having been cleaned with a wire brush prior to coating. The carbon substrate was a small piece of reinforced carbon made in accordance with U.S. Pat. No. 3,462,289, the piece being about 8 in. long by about ⅝ in. high and ⅝ in. width. The paint coatings were brushed on the piece in separate bands so that only part of the surface was covered, the other part remaining uncoated for comparison. The piece was heated at 350°F in an autoclave under a nitrogen pressure of 120 psi for 45 minutes, followed by an additional heating for 15 minutes without pressure to complete the curing of the coatings. The coated piece was then heated in a muffle furnace for one hour at 800°–850°C while exposed to air. The coated surfaces showed no oxidation, in contrast to the uncoated surface which, after the hour in the muffle furnace, showed severe oxidative deterioration.

Heating of the coated sample was continued as before and the treated surfaces were examined at one hour intervals. After four more hours of heating, the coated surfaces were still intact but some oxidation had taken place at the boundaries of the coated areas where part of the coating had been undermined due to oxidation of the uncoated surface and penetration of the oxidative process beneath the surface of the coating on the coated areas.

Although in the example given, the paint of the invention was applied with a brush, other methods of application may be used such as spraying, dipping or rolling, spraying being especially useful for coating carbon articles of irregular contours. It is desirable that the application method be such that a thin uniform coating results, bead or droplet formation in the coating will result in weak spots when the article is heated for curing. Further testing on carbon articles, coated with the compositions of the invention and properly cured according to recommended procedures, have shown that these compositions and methods provide superior oxidation protection. The boron containing coating is firmly adherent to the surfaces of the carbon articles and resists high temperatures, this combination of properties thereby providing unique and long lasting protection to articles which are subjected to both thermal and mechanical stresses.

What is claimed is:

1. A method for making a carbonaceous article comprising reinforced and laminated carbon oxidation resistant by forming a coating thereon, comprising the steps of:

a. coating the surface of the article with a thin uniform layer of a suspension comprising about 10 to about 35% of elemental boron having an average particle diameter in the range of about 0.5 to about 2 microns, said elemental boron being dispersed in a thermosetting resin solution, said solution comprising about 40 to about 60% furfuryl alcohol prepolymer, about 40 to about 60% furfural and about 1 to 10% maleic anhydride; and b. heating the coated article in the temperature range of about 300° to about 400°F under an inert atmosphere, thereby curing the coated suspension for forming the oxidation resistant coating on the article.

2. An oxidation resistant carbonaceous article comprising reinforced and laminated carbon having a surface coating of finely divided elemental boron, said elemental boron having average particle diameters in the range of about 0.5 to about 2 microns, said elemental boron suspended in a cured thermosetting resin, the elemental boron comprising about 10 to about 35% of said resin suspension, and said resin comprising about 40 to about 60% furfuryl alcohol prepolymer, about 40 to about 60% furfural, and about 1 to about 10% maleic anhydride, said coating having been deposited on the exterior of said carbonaceous article from the application of said elemental boron containing resin suspension.

* * * * *